J. H. RAMSEY, H. M. CLEARWATER & J. TEMPLE.
BLANK FOLDING MACHINE FOR THE MANUFACTURE OF COLLARS, CUFFS, AND THE LIKE.
APPLICATION FILED FEB. 13, 1911.
1,043,722.
Patented Nov. 5, 1912.
10 SHEETS—SHEET 6.
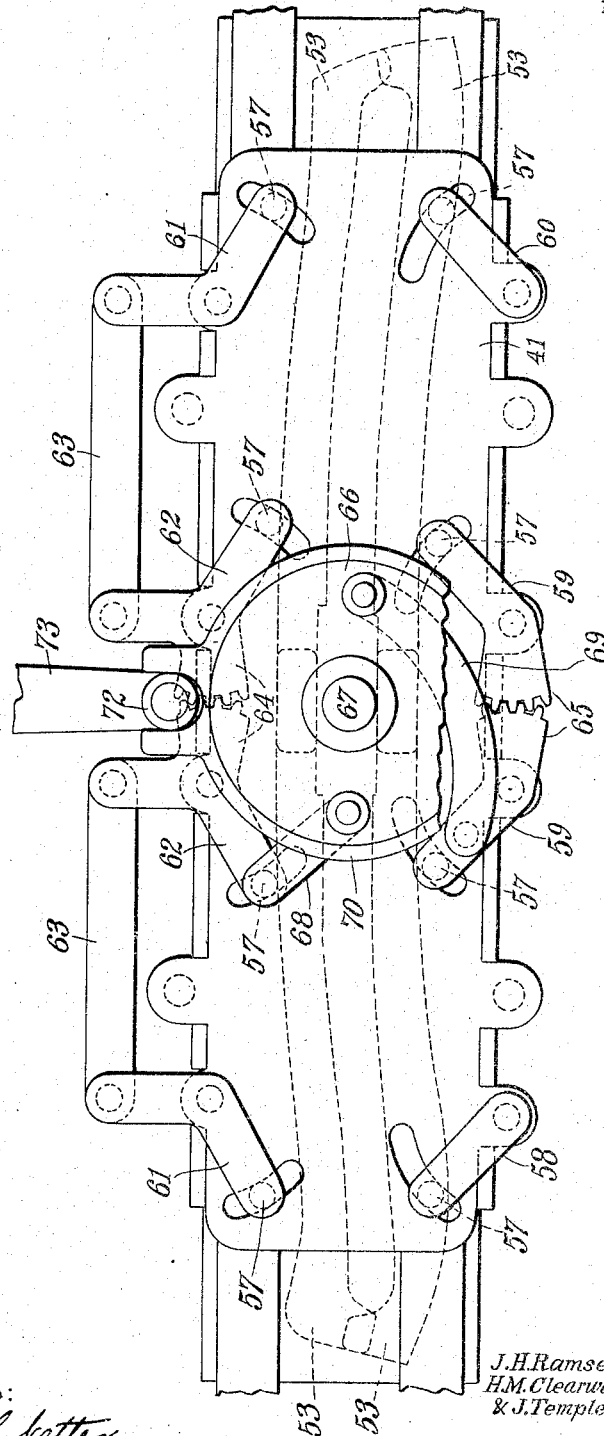

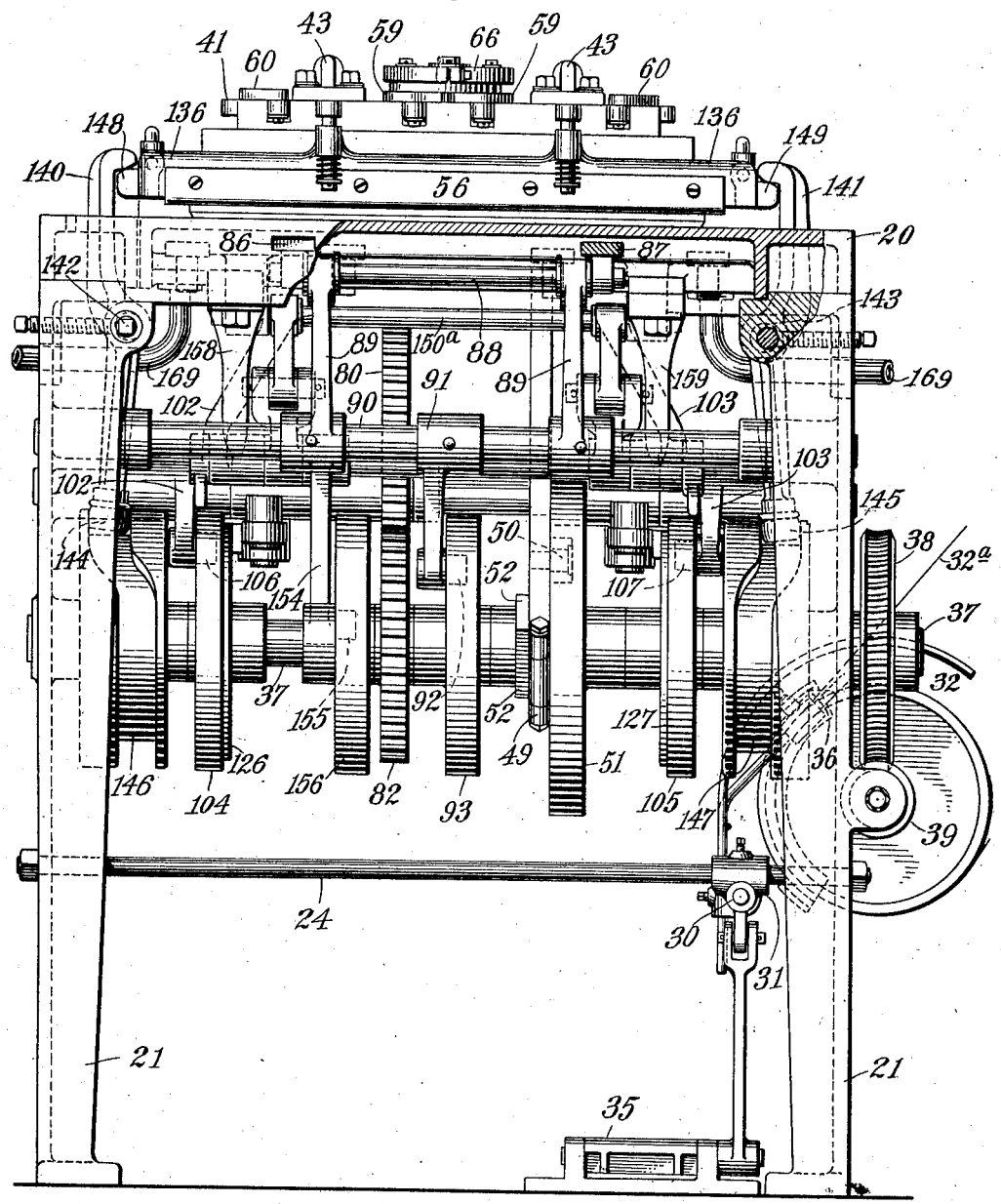

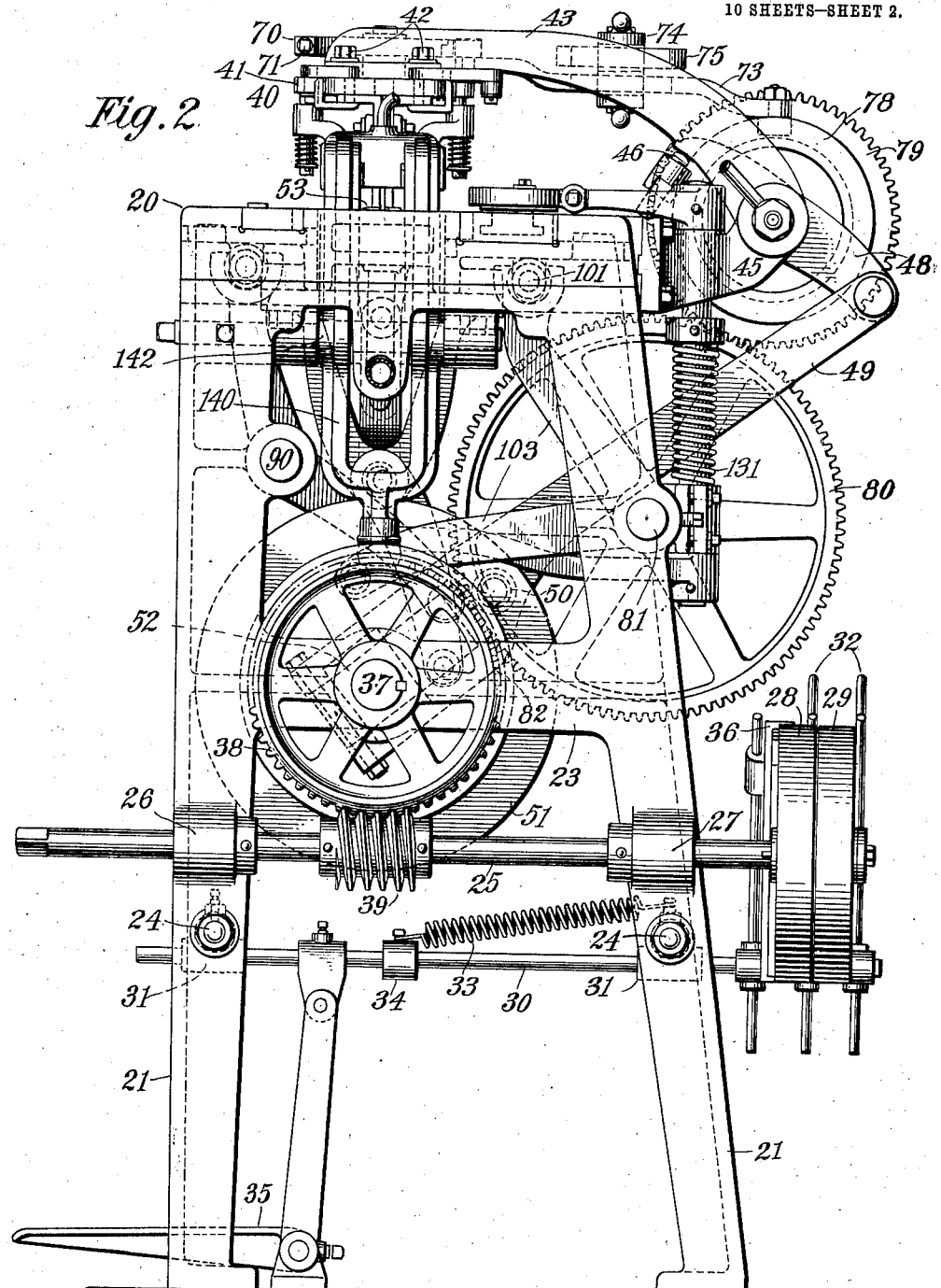

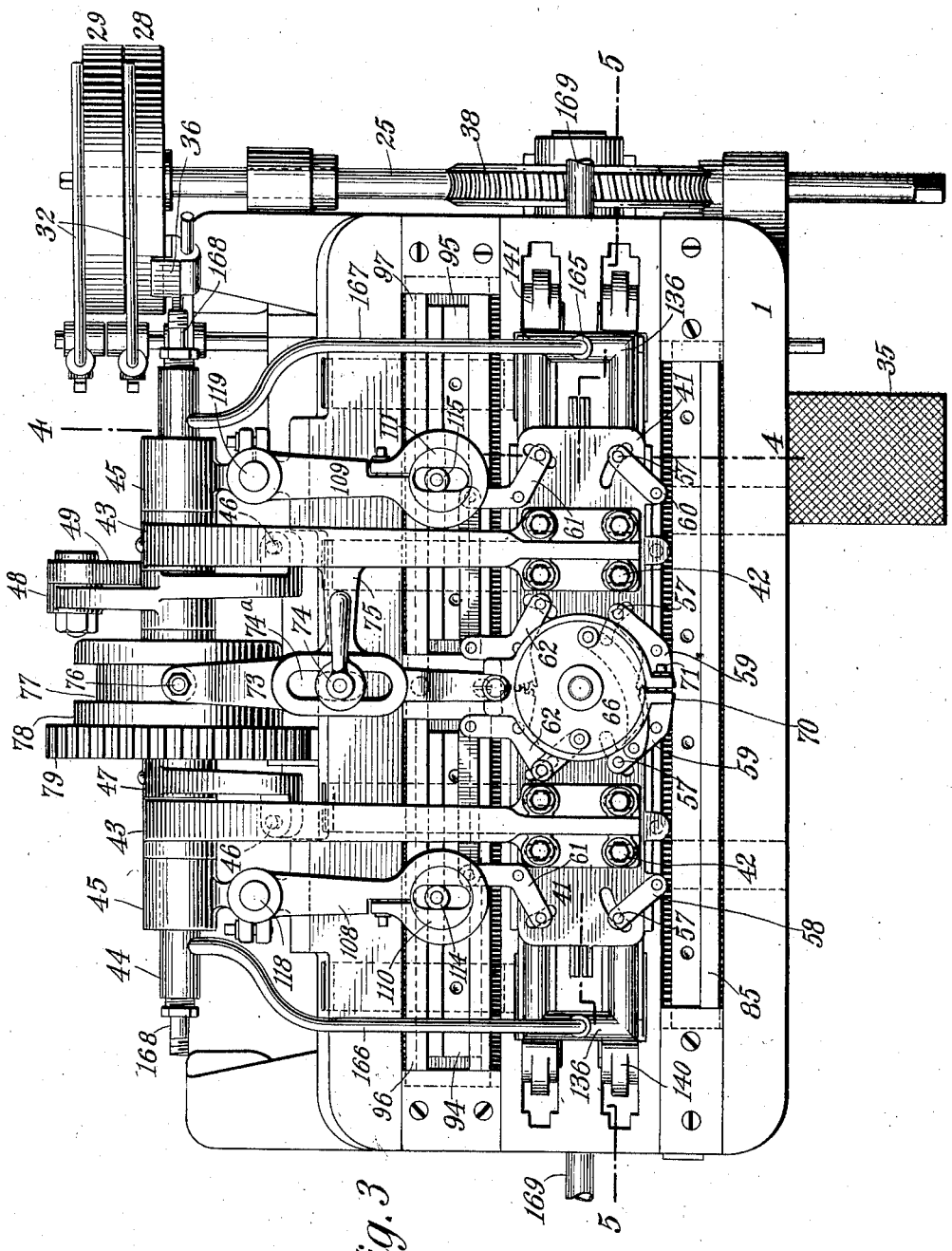

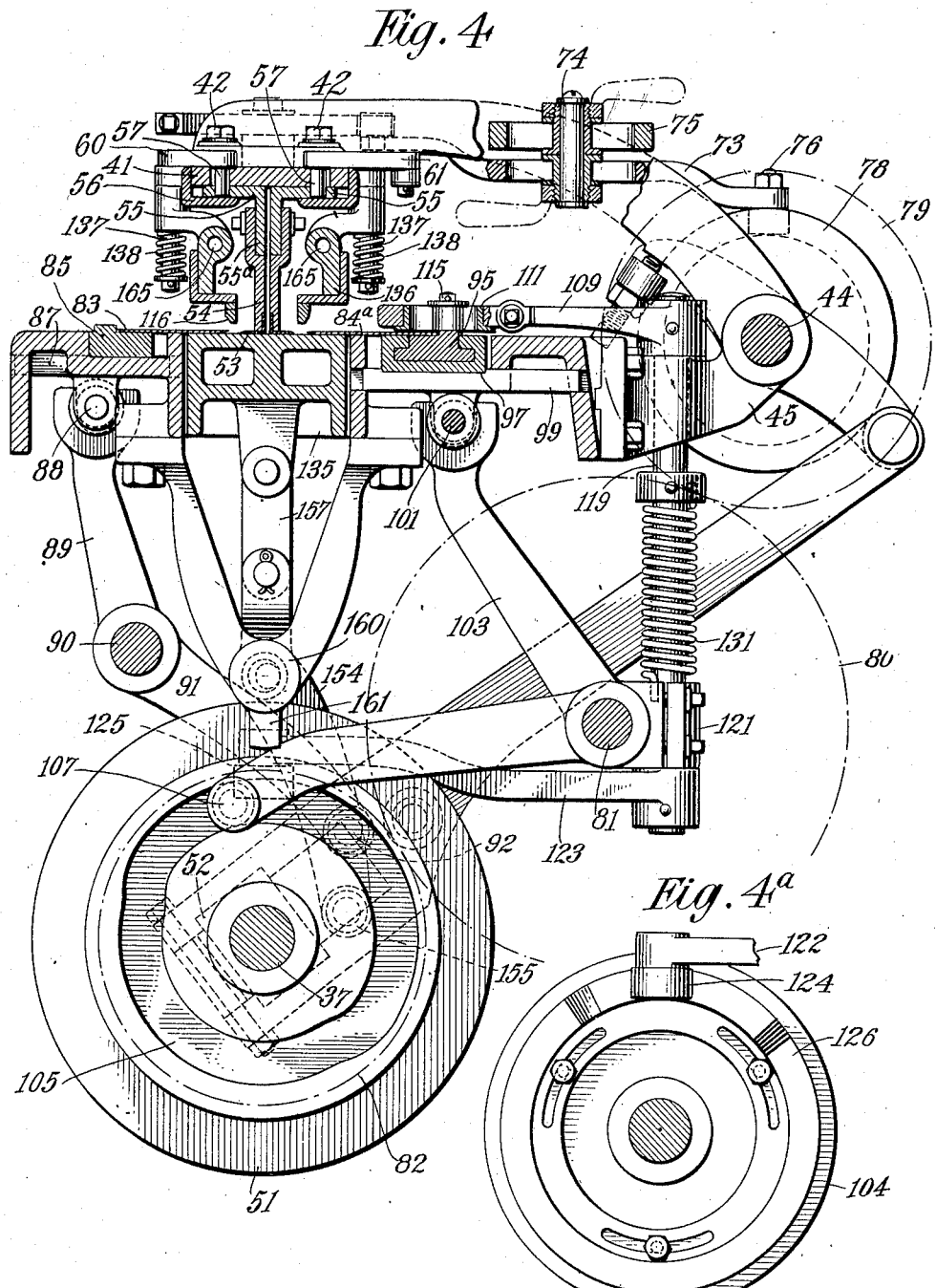

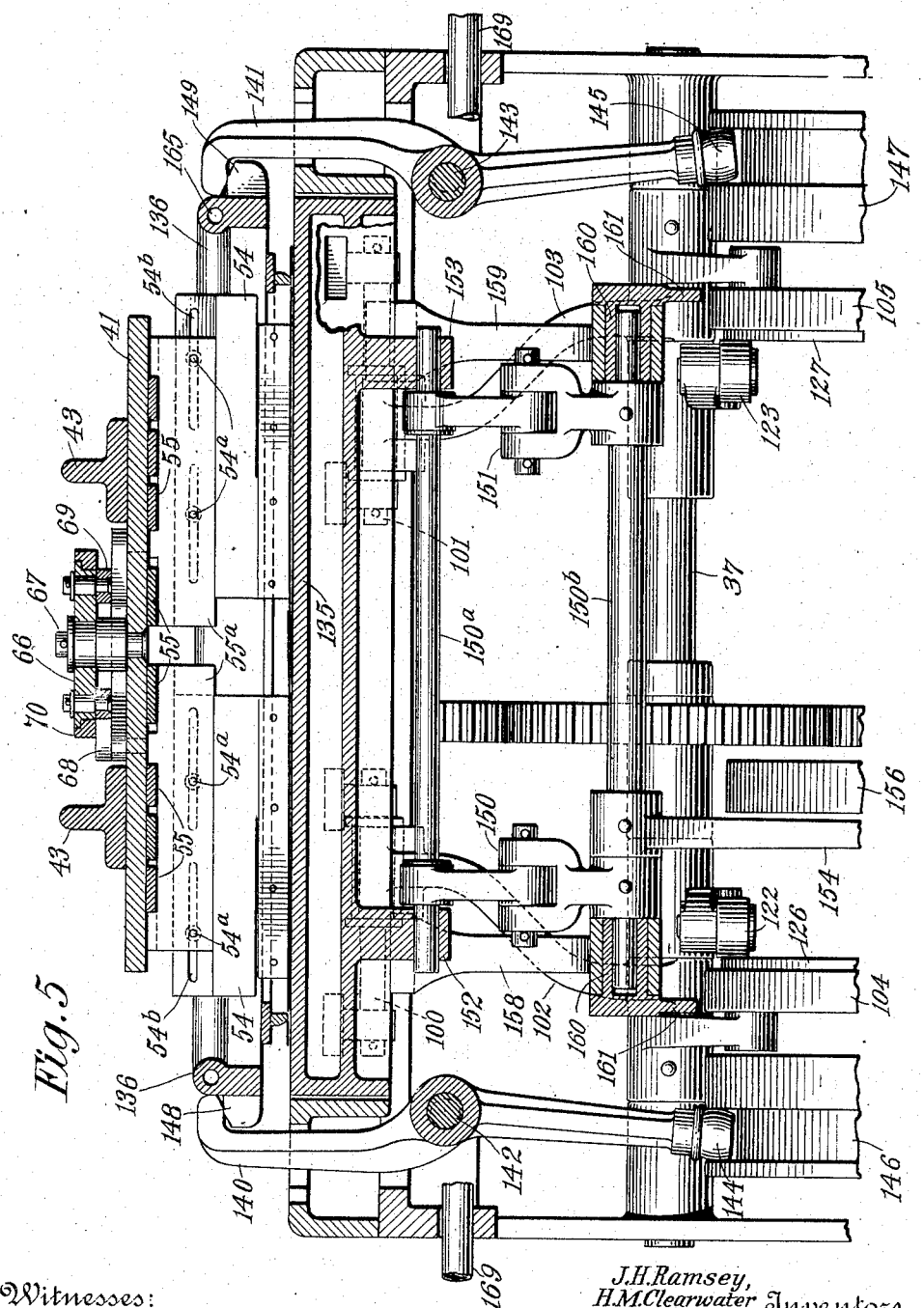

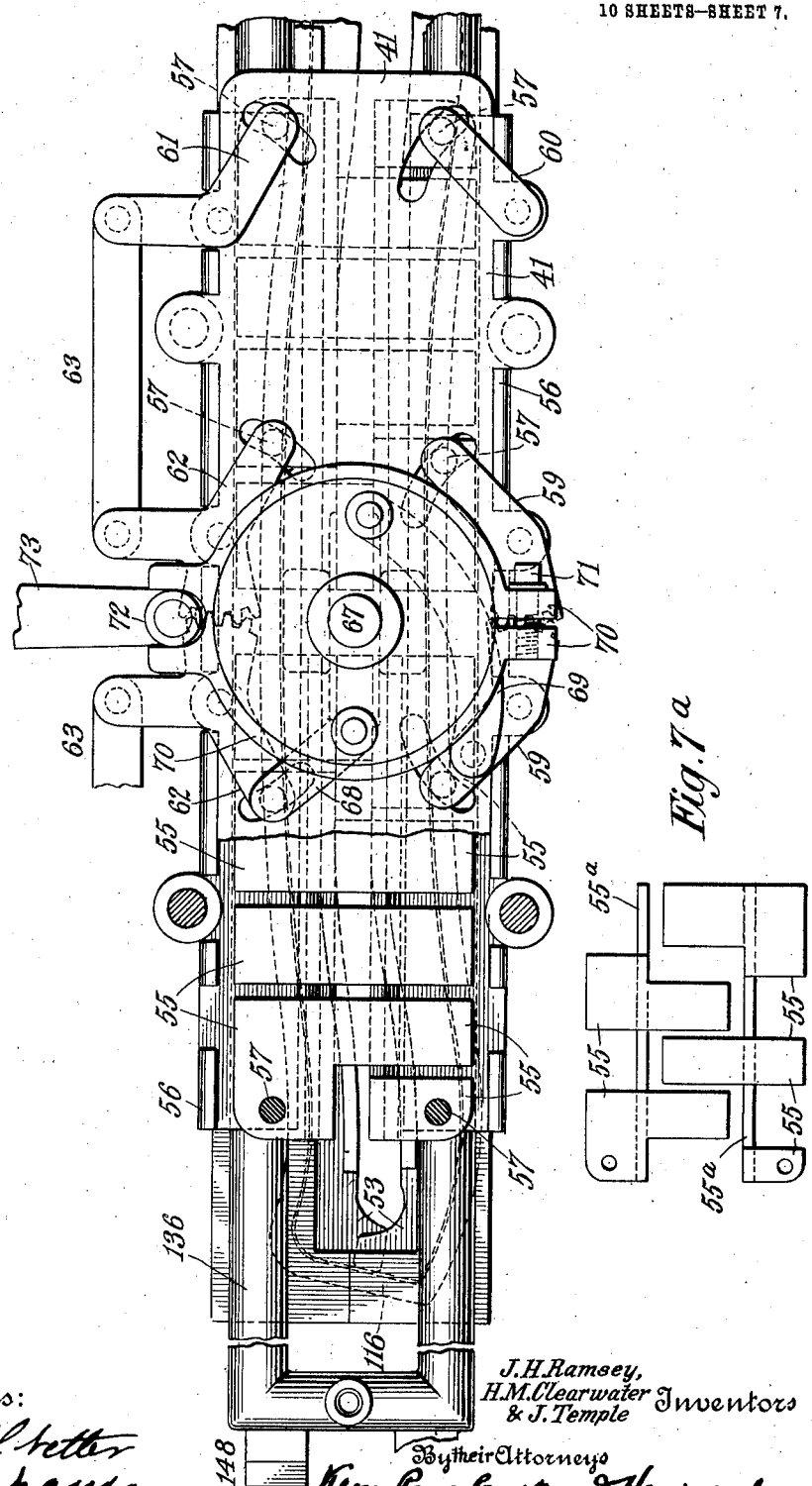

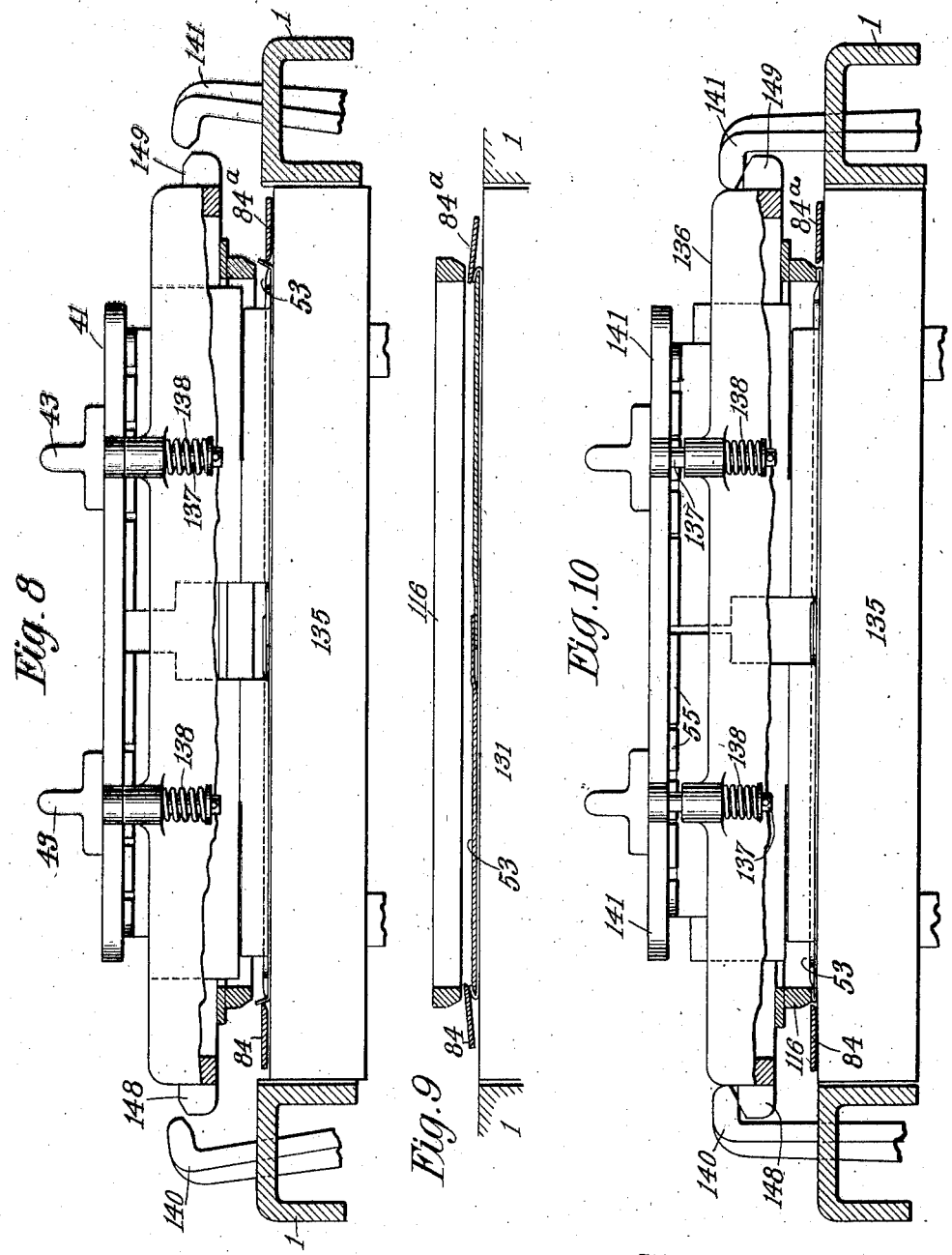

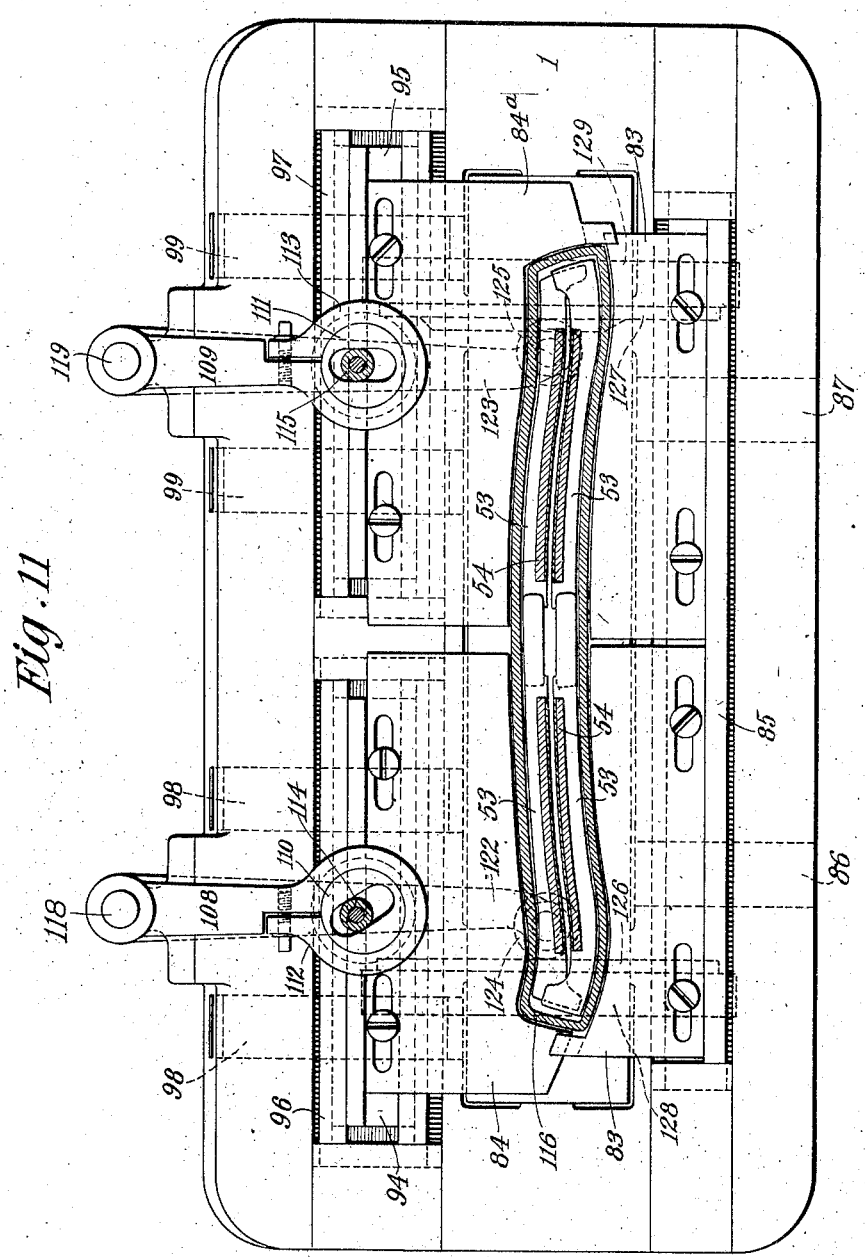

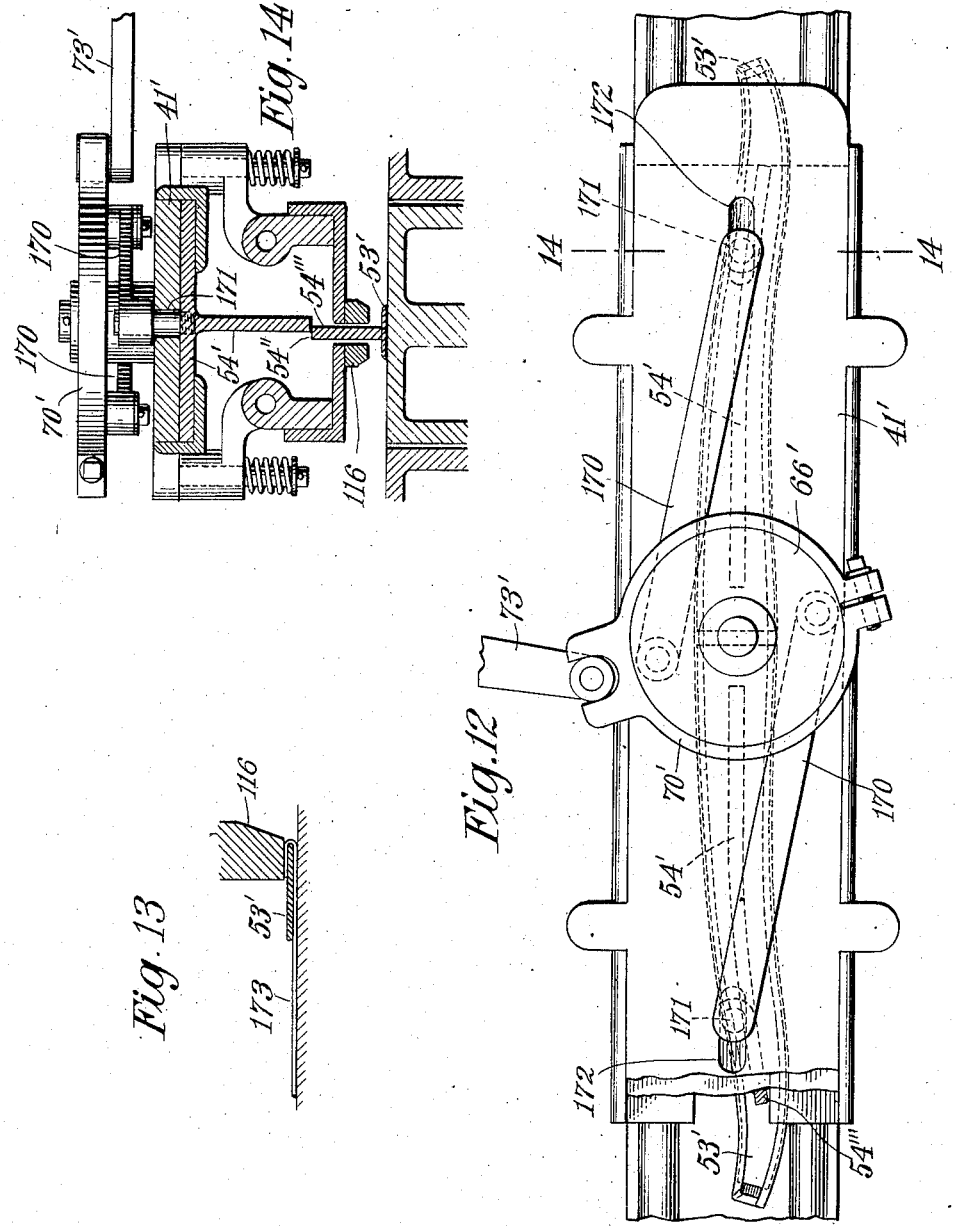

UNITED STATES PATENT OFFICE.

JOSEPH H. RAMSEY, OF ALBANY, HARLEY M. CLEARWATER, OF TROY, AND JOHN TEMPLE, OF WATERVLIET, NEW YORK, ASSIGNORS TO EARL & WILSON, OF TROY, NEW YORK, A CORPORATION OF NEW YORK.

BLANK-FOLDING MACHINE FOR THE MANUFACTURE OF COLLARS, CUFFS, AND THE LIKE.

1,043,722.     Specification of Letters Patent.     Patented Nov. 5, 1912.

Application filed February 13, 1911. Serial No. 608,244.

*To all whom it may concern:*

Be it known that we, JOSEPH H. RAMSEY, a citizen of the United States, residing at Albany, in the county of Albany and State of New York, HARLEY M. CLEARWATER, a citizen of the United States, residing at Troy, in the county of Rensselaer and State of New York, and JOHN TEMPLE, a subject of the King of Great Britain, residing at Watervliet, in the county of Albany and State of New York, have invented certain new and useful Improvements in Blank-Folding Machines for the Manufacture of Collars, Cuffs, and the Like, of which the following is a specification, reference being had to the drawings accompanying and forming part of the same.

This invention relates to machines for turning or folding collar, cuff, shirt-bosom, neckband, wristband, and like blanks from which such articles are made, and its chief object is to provide an improved machine for the purpose, which shall be as simple in construction as the nature of the work to be done permits, and withal rapid and efficient in operation.

A further object is to provide folder-actuating mechanism whereby the folders or folding-blades can be given any movement necessary for the proper folding of blanks of widely different shapes.

Another object is to provide blank-pressing mechanism in which adequate pressure can be secured without subjecting the mechanism to injurious stress such as would cause strain or undue wear of the parts.

To these and other ends the invention consists in the novel features of construction and combinations of elements hereinafter described, and more particularly set forth in the claims.

Upon reading the subjoined description of the preferred embodiment, in connection with the claims and the accompanying drawings, it will be apparent to those skilled in the art that the invention can be embodied in a considerable variety of forms without departure from its proper spirit and scope. We have therefore not deemed it necessary to refer specially to any of the numerous modifications and arrangements of which the invention is capable, but have confined our description to the machine which at the present time is believed to exhibit the various features of the invention in their most convenient and effective form.

Referring now to the drawings, Figure 1 is a front elevation of a complete machine constructed in accordance with our invention, for folding collar blanks. Fig. 2 is an end elevation, viewed from the right of Fig. 1. Fig. 3 a top plan view of the complete machine. Fig. 4 is a detail cross section on line 4—4 of Fig. 3. Fig. 4$^a$ is a detail view of one of the cams and its adjusting devices. Fig. 5 is a longitudinal section substantially on line 5—5 of Fig. 3. Fig. 6 is a detail plan view of the mechanism on the presser head for contracting and expanding the templet or die. Fig. 7 is a plan view of the presser head, partly in horizontal section. Fig. 7$^a$ is a detail plan view of part of the presser head. Figs. 8, 9, and 10 are detail front views, partly in section, showing successive positions of the presser head, the collapsible die or templet, the folders, and the pressing device or presser. Fig. 11 is a plan view of the bed plate of the machine with the presser head removed, to show the folders and the devices for actuating the same. Fig. 12 shows in plan a construction in which the pressing of the folded blank is effected before the blank is freed from the templet. Fig. 13 is a detail sectional view showing the pressing of the blank on the templet. Fig. 14 is a section on line 14—14 of Fig. 12.

The detailed construction of the machine will be more readily understood if its general operation, which is as follows, is kept in mind: The collar blank, composed of one or more layers of cloth cut to proper form, is laid in position on the bed of the machine. The presser head is then lowered, bringing the expanded templet or die down upon the blank, after which the folders move inwardly under the outwardly projecting edges of the blank and fold the same inwardly over the edges of the templet. The presser, encircling the expansible and collapsible templet or die, now begins to descend, and as it approaches the folded edge or edges of the blank the templet is contracted and the folders expanded or withdrawn, so that as the folders and the templet clear the folded edges the presser engages the latter and the same are pressed firmly between the bed and presser. The presser now remains in this position momentarily, to insure the fold being "set," (the presser and the bed plate being suitably heated), after which the presser head is raised, carrying with it the presser and templet. During this last movement the templet is expanded again. When the head is raised sufficiently above the bed plate the folded collar-blank is removed by the operator (or by suitable "picking" mechanism, not shown), leaving the machine ready to receive the next blank. The framework in or upon which the movable parts of the machine are mounted comprises a bed or bed-plate 20, and two end frames composed of legs 21 connected by cross members 23 and tie rods 24. The forwardly extending driving shaft 25 is journaled in lugs 26, 27, on the right-hand end frame, and at its rear is equipped with tight and loose pulleys 28, 29, respectively. Parallel to this shaft is a belt-shifting rod 30 slidably supported by carriers 31 on the tie rods 24, and at its rear the rod is provided with shifting forks 32 by which the driving belt, indicated diagrammatically at 32ª, can be shifted from the loose to the tight pulley, and vice versa. Normally the fork is held in its rearward position, as shown in Fig. 2, (in which position the belt is on the loose pulley and the machine therefore out of operation), by a contractile spring 33 having one end attached to a collar 34 adjustably mounted on the rod 30 and its other end attached to the rear carrier 31. For the purpose of actuating the belt shifter a pedal or foot lever 35 is provided, connected at its upper end to the shifting rod 30. It is desirable that the operation of the machine be arrested instantly upon the release of the pedal, and for this purpose a brake 36 is provided, mounted on the shifting rod and adapted to bear on the side of the tight pulley when the shifting rod is retracted by the spring 33 after release of the pedal. The main cam shaft 37, journaled in the cross pieces 23, carries at its end a worm gear 38, by which it is driven through the instrumentality of a worm 39 on the driving shaft 25.

The presser head, designated generally by 40, comprises a plate 41, secured by screws 42 on the underside of the forward ends of a pair of arms 43. To permit adjustment of the plate forwardly or rearwardly the slots 42ª in the arms through which the screws 42 pass are elongated. At their rear ends the presser-head actuating arms 43 are mounted on a rock shaft 44 journaled in brackets 45 extending rearwardly from the back of the bed 1. One of said arms is pinned to the shaft. Extending under the arms and engaging the same by means of adjustable screw tops 46 are two rocker arms 47, 48, the first pinned to the rock shaft and the second loose thereon and provided with a rearward extension pivotally connected to a downwardly and forwardly extending link 49. Near its forward end this link is provided with a laterally extending stud 50 (in the form of an anti-friction roller) engaging a cam groove in the side of a face cam 51 on the shaft 37. Forwardly of the roller 50 the link is forked, to embrace a square collar 52 loose on the cam shaft, so that as the cam revolves the link will be reciprocated and the arm 48 rocked. When the forward end of arm 48 rises the right hand arm 43 is raised, and being pinned to the rock shaft 44, communicates motion to the arm 47 which is also pinned to the shaft. The latter arm in turn raises the left hand arm 43, which is loose on the shaft. By adjustment of the screw studs 46 the arms 47 and 48 can be made to work in unison, sharing the weight of the presser head equally. The construction just described obviates the necessity of extremely accurate machine work in making the parts concerned, as will be readily understood.

The expansible and collapsible die or templet 53 is divided longitudinally and transversely into four parts, secured on the bottoms of four carrying plates 54 which are in turn attached to angular actuating members or plates 55 held snugly but movably against the underside of the supporting plate 41 by means of suitable clamping members 56. The actuating members 55 are themselves actuated through the instrumentality of the pins 57 extending upwardly through arc-shaped slots in the supporting plate into pivotal connection with the swinging arms 58, 59, 60, 61, 62, fulcrumed on the said plate. The arms or levers 61 are connected by links 63 to the arms 62. These latter are formed with intermeshing gear segments 64, and the arms 59 are similarly connected by gear segments 65. It will therefore be seen that oscillation of either lever 62 will give a parallel movement to the connected lever 61, and an equal but opposite movement to the other levers 62 and 61. Similarly, movement of either lever 59 will cause equal and opposite movement of the other lever 59. At the same time the outer and forward pins 57, being guided by their slots and by the arms 58, 60, compel the forward templet segments 53 to move bodily in lines parallel to the forward slots in the supporting plate 41. It will now be seen that suitable actuation of the levers 59 and 62 will cause the templet segments to move inwardly and outwardly along lines parallel to the arc-shaped slots in the supporting plates. To afford wide bearing surfaces for the templet actuating plates 55 the latter are made in sections, as shown in Fig. 7, the alternate sections being connected by vertical plates 55ª to form the respective plates and the sections of each plate extending between those of the other. Thus each plate is supported by both the clamping members or supports 56 when the templet is in its collapsed or contracted position. The templet carrying members 54 are adjustably attached to the vertical portions, 55ª, of the templet-actuating plates by means of screws 54ª extending through slots 54ᵇ in said carrying members. The same templet can thus be used for collars of different lengths.

For the purpose of actuating the templet-shifting levers a disk 66 is provided, capable of a partial movement of rotation in either direction about a supporting stud 67 on the supporting plate 41, and connected by a link 68 to the inner end of the left-hand lever 62 and by a link 69 to the left-hand lever 59, the said links being connected to the disk on opposite sides of the center thereof. Encircling the disk is a split collar 70, clamped tightly to the disk by means of a screw 71 at the front and having at the rear a notch engaging a roller-stud 72 on the forward end of a lever 73 adjustably fulcrumed at 74 in an arm 75 extending laterally from one of the presser head supporting arms 43. At its rear end the lever 73 carries a stud 76 extending into a groove 77 in the rim of a barrel cam 78 loose on the rock shaft 44, so that as the cam revolves the lever will be oscillated, thereby oscillating the disk 66 and shifting the templet segments as before explained. The throw of the lever, and hence the extent of motion of the templet segments, is regulated by shifting the fulcrum block 74 forwardly or rearwardly in the slot 74ª in the arm 75. The cam 78 is rotated by a gear 79 fixed to the side of the cam and driven by an idle gear 80 loose on a counter shaft 81 and meshing with a gear 82 keyed to the cam shaft 37. The gears 79 and 82 have the same pitch diameter, so that the two rotate in unison, thus giving the first named gear one complete revolution at each rotation of the cam shaft.

The folders or folder-blades are four in number, two front blades 83 and two rear blades 84, 84ª. The front blades are adjustably mounted on a forwardly and rearwardly movable plate 85 mounted on the bed plate 1, which plate 85 is connected to two rearwardly extending slides 86, 87, movable in suitable slots in the bed plate. These slides are connected at their front ends by a rod 88, which is in turn engaged by the forked ends of two actuating arms 89 extending upwardly from a rock shaft 90 journaled in the forward legs 21 of the end frames. Extending downwardly and rearwardly from this shaft is an arm 91, having on its end a stud 92 extending laterally into a cam groove in the side of a face cam 93 on the cam shaft 37. This groove is so shaped that as the cam revolves the arms 91 and 89, the slides 86, 87, the plate 85 and the folders 83 will be actuated in proper time-relation to the other operations of the machine, as described hereinafter. In the present embodiment of our invention the front folders, 83, have only a forward and back movement, but they may also be given a lateral movement if desired, by means like that for actuating the rear folders, now to be described.

The rear folders, 84, 84ª, are adjustably mounted on members 94, 95, slidable in plates 96, 97, in a direction transverse to the machine, which plates are in turn capable of forward and rearward movement in recesses in the top of the bed plate 1. The last-named plates are connected to slides 98, 99, in the bed plate, and the slides are connected in pairs by rods 100, 101, which are engaged by the forked upper ends of rocker arms 102, 103, on the countershaft 81, operable independently of each other by cams 104, 105 on the main cam shaft, which cams have in their outer faces grooves engaging studs 106, 107 on the lower ends of the arms 102, 103. The capability of independent operation is an important feature for the reason that collars may be so shaped as to require these folders to move differently.

The movement of the rear folders, effected directly by the cams 104, 105, is backward and forward only. To give the folders a lateral movement, concurrently with or before or after the said backward or forward movement the following devices are provided. Overhanging the members 94, 95, are two horizontal arms 108, 109, carrying at their forward ends slotted cam disks 110, 111, which may be secured in any position of adjustment by means of the clamping rings 112, 113. On the members 94, 95 are roller studs 114, 115, extending up into the slots in the said cam disks. Assuming that the arms 108, 109 are stationary, it will be seen that if the slots in the disks are alined with the direction of movement of the slides 98, 99, (as is the slot in the disk 111 in Fig. 11) the members 95 will have no lateral motion as the plates 96, 97 move forward and back. On the other hand, if the disks are turned so as to incline the slots, as is the disk 110 in Fig. 11, it will be seen that the members 94, 95, will be moved laterally as the plates 96, 97 move backwardly and forwardly, the resultant movements of the folders 84, 84ª, being along lines parallel to the slots in the cam disks. This resultant motion is employed where the collar has a rounded or an obtuse-angled corner which must be "plaited" in to make a smooth or sightly seam. Thus in Fig. 11 the contour of the collar, indicated by shape of the presser 116, requires that the folder 84 move on a line approximately bisecting the angle of the rounded corner. The cam disk 110 is therefore turned to bring its slot parallel to such line of bisection. It may, however, be necessary not to combine the motions of the parts 94—96 and 95—97 into resultant motions of the folders, but instead to keep the lateral movements distinct. This is accomplished as follows:

The arms 108, 109, are mounted on vertical rock shafts 118, 119, journaled in the brackets 45 and at their lower ends mounted in supports loosely embracing the countershaft 81. These supports, one of which is shown at 121 are in the form of split collars, provided with clamping screws, by which the vertical shafts may be clamped with the arms 108, 109 in any position. Pinned to the lower ends of the vertical shaft are forwardly extending arms 122, 123, provided at their ends with roller studs 124, 125 bearing against cam rings 126, 127 circumferentially adjustable on the cams 104 and 105.
It will now be seen that as the cams revolve the shafts 118, 119 will be rocked, thereby swinging the arms 108, 109 and hence shifting the members 94, 95, and folders 84, 84ª, laterally. If the cam rings are of such form and so adjusted as to cause the arms 122, 123 to swing while the plates 96, 97 are being actuated the movements of the folders 84, 84ª will be the resultants of the movements of the plates 96, 97, and the members 94, 95. This method of producing such resultant motion may be employed if desired, but the simpler method is to suitably adjust the slotted disks 110, 111, as previously described; in which case the cam rings 126, 127 are omitted or replaced by plane rings and the rock shafts 118, 119 adjusted in the collars 120, 121 to bring the arms 108, 109 to the proper positions. For the purpose of causing the follower arms 122, 123 to bear at all times firmly against the rings on the cam disks 128, 129, coil springs of which one is shown at 131 are provided on the shafts 118, 119, the upper ends of the springs being connected to the shafts and the lower ends to the supports 121.

Suppose, now, that the collar blank to be folded has a pointed instead of a rounded corner, like that indicated at the right of Fig. 11. In such case a diagonal movement of the folder, folding both the side edge and the end edge simultaneously, might produce a pucker at the corner, which would make an unsightly bulge or lump in the finished article. The proper procedure in a case of this kind is to fold one edge and then fold the other edge over on the first. This is conveniently accomplished as follows in the machine illustrated. The cam disk 111, for example, is adjusted to bring its slot into parallelism with the direction of movement of the plate 97. Now, as previously described, the folder 84ª will have only a forward or back motion, thus folding only the back edge of the collar. To give it a leftward movement after the forward movement, to fold the end edge of the collar, a cam ring 127 of suitable shape is provided on the disk 129 and so adjusted that at the proper instant the ring will swing the follower arm 123 toward the left, thereby rocking the shaft 119, and through the instrumentality of the arm 109 shifting the member 95 and folder 84ª in the same direction. It will of course be understood that if the slot in the disk 111 be inclined, like the slot in disk 110 in Fig. 11, instead of alined with the direction of movement of the backwardly and forwardly movable plate 97 as shown in Fig. 3, the movement of the folder caused by the plate 97 will be accompanied by a lateral movement due to the inclined position of the slot. Thus by suitable design and adjustment of the various parts which coöperate to actuate the folder it is possible to provide for any movement of the folders that may be required in practice.

The pressing of the folded edges is effected between a presser 116 encircling the templet-carriers 54 and conforming in shape to the contour of the folded collar-blank, and a bed 135 movable vertically in the bed plate 1. The former is mounted on the bottom of a carrier 136 supported on stems 137 depending from the front and rear edges of the presser-head plate 41. The carrier 136 is movable vertically on these stems, but is normally held in its upper position by coil springs 138 encircling the stems. At the sides of the machine are two bifurcated levers 140, 141, fulcrumed at 142, 143 to swing in transverse planes and provided at their lower ends with spherical roller-studs 144, 145, engaged by cam grooves in the peripheries of barrel cams 146, 147 on the main cam shaft 37. The upper ends of these levers are bent laterally to form hooks, as shown, to coöperate with lugs 148, 149 on the presser-carrier. The coöperating surfaces of the hooks and lugs are beveled, as indicated in Fig. 5, so that as the hooks are moved inwardly by the operation of the cams 146, 147, (while the presser head is in its lower position) the hooks will force the pressure down upon the folded collar-blank against the tension of the supporting springs 138. This movement is not intended to do much if anything more than bring the presser down on the folded collar-blank, after which the presser is held in such position by the flat faces of the lugs and hooks. It will therefore be seen that the stress on the cams 146, 147 is at no time greater than the tension of the springs 138 transmitted through the levers 140, 141.

The presser being held in depressed position by the levers 140, 141, the presser-bed 135 is raised, to press the collar blank powerfully against the presser. To effect this movement of the bed a pair of toggle levers 150, 151, is provided, having their upper ends connected to a rod 150ᵃ mounted in lugs 152, 153 depending from the bed, and having their lower ends pinned to a shaft 150ᵇ. Pinned to the same shaft is a depending arm 154 having at its lower end a roller stud 155 projecting laterally into a suitable cam groove in the face of a cam 156 on the main cam shaft 37, so that as the cam is revolved by the shaft the oscillation of the arm 154 thus caused will straighten the toggles and raise the presser bed up against the presser. As soon as the toggles are straightened the stress occasioned by the pressure of the bed against the presser 116 is taken by the shaft 150ᵇ and the brackets 158, 159 which support the same, thus relieving the cam of practically all work until the bed has to be raised again. Of course the work of actuating the arm 154 to flex or buckle the toggles and lower the bed is comparatively slight.

The pressure produced by the upward movement of the presser bed 135 can be regulated by raising or lowering the toggle shaft 150ᵇ as circumstances may require. For this purpose the shaft is journaled in eccentric bearing sleeves or bushings 160 rotatably adjustable in the brackets or hangers 158, 159, the bushings being provided with finger pieces 161 for convenient grasp in making the adjustment.

To heat the presser 116 the carrier 136 is provided with steam passages 165, connected by pipes 166, 167 to the hollow ends of the rock shaft 44. Steam supplied to one end of the shaft through one of the connections 168, say that at the left for example, flows through the pipe 166, then through the passages 165, and thence out by way of the pipe 167. The hollow bed 135 is also heated by steam flowing through its interior, flexible pipes 169 being provided to carry the steam to and from the bed.

From the foregoing description of the various mechanisms composing the machine the operation of the same will be readily understood.

The presser head 40 being raised, the collar blank is placed on the bed over the space defined by the inner edges of the folding blades 83, 84, 84ᵃ, which at this stage are in their outer position. To enable the blank to be placed in position accurately and quickly suitable guides may be provided on the folders, but as guides for this purpose are well known in the art it is deemed unnecessary to illustrate or describe them here. The revolving cam 51 now actuates the link 49, rocking the shaft 44 and lowering the arms 43 and the presser head 40. This brings the expanded templet 53 down upon the collar blank and presses the same into the space defined by the folders, which space is a little larger in size but has exactly the contour of the blank after folding. The cam 93 now moves the arm 91 forward, thus rocking the shaft 90 and swinging the arms 89 rearward. The latter, though the instrumentality of the slides 86, 87, carry the front folders 83 straight toward the rear, thereby folding the front edge of the collar blank over the front edge of the templet. The cams 104, 105 now actuate the arms 102, 103 on the shaft 81, thereby moving the plates 96, 97 forward; the resulting movement of the rear folders 84, 84ᵃ being determined by the positions of the cam disks 110, 111, as previously described. It will also be remembered that the arms 108, 109, and disks 110, 111, may be availed of to give the rear folders lateral movement before, after or during their forward movement, by suitable design and adjustment of the cam rings 126, 127 on the cams 104, 105, etc. The steam-heated bed 135 now drops slightly to relieve the pressure on the templet, after which the cam 78, rocking the lever 73 and turning the disk 66, begins to collapse or contract the templet through the instrumentality of the links 68, 69, levers 62, 59, etc. While the templet is contracting, the cams 93, 104, 105 begin to withdraw the folders, and at the same time the cams 146, 147 start the hooked ends of levers 140, 141 inwardly thereby causing the same to engage the lugs 148, 149 on the presser carrier 136. As the latter is depressed the outward movements of the folders are completed in time to cause their inner edges to escape the presser 116, which now comes down upon the folded edges of the collar blank just as the collapse of the templet is completed. It may here be noted that the bottom of the presser is of sufficient size to more than cover the folded edges of the blank, by perhaps a sixteenth of an inch, to insure that no "bead" will be produced around the blank, as might be the result if the presser were smaller or no larger than the folded blank. The presser being locked in its lower position by the levers 140, 141, as described, the cam 156 actuates the arm 154, thereby rocking the toggle shaft 150ᵇ, straightening the toggles 150, 151 and hence bringing the presser bed 135 up against the folded collar blank and pressing the same against the presser 116 with great force. This pressure is maintained for a period long enough for the steam-heated presser and bed to give the folded edges of the damp collar blank a permanent set. The toggles are then buckled by the continued rotation of the cam 156, thus lowering the bed 135, and the cams 146, 147 swing the levers 140, 141 out of engagement with the presser carrier 136, allowing the springs 138 to raise the same and the presser 116. The cam 51 now advances the link 49, rocking the shaft 44 and raising the arms 43 and the presser head 40. As the latter is being raised the cam 78 starts the movement of the lever 73, which, through the instrumentality of the disk 66 and associated elements, re-expands the templet 83. The folded and pressed collar-blank is now removed, and the machine is then ready for its next cycle of operations. Of course the operation can be arrested at any stage by the operator removing his foot from the controlling pedal 35, thereby allowing the spring 33 to retract the rod 30, shifting the driving belt to the loose pulley 28 and bringing the brake 36 up against the tight pulley 29.

In the modification shown in Figs. 12 and 14, the templet is composed of two parts, 53', movable toward and from each other. These parts are curved in plan, and are mounted on the lower edge of two members 54', of T-shaped cross-section, slidably mounted on the under side of the presser head 41'. At their outer ends these members are slit inwardly, as indicated at 54'', to permit the lower portions of said ends to be bent into conformity to the shape of the templet, as indicated at 54'''. For the purpose of actuating the members 54', which in turn move the templet sections 53', said members are connected with links 170 by studs 171 extending upwardly through slots 172 in the plate 41'. The inner ends of the links are pivoted to an oscillatory disk 66' on opposite sides of its center, said disk being encircled by an annulus 70' engaged by a lever 73'' similar to the lever 73 in Figs. 3 and 4 and actuated in the same manner, so that as the lever is oscillated on its fulcrum it will actuate the disk 66' and so move the templet 53' to and fro. The blank is folded over the templet when the latter is in its expanded position, but collapse of the templet does not free it entirely from the blank, but leaves it free only at the ends so that to disengage the blank the latter has to be stripped off. While the templet is expanded the presser 116, Fig. 13, comes down upon the fold, as indicated in the figure just mentioned. After the pressing is effected the templet is collapsed and the blank stripped off.

As previously stated, the invention can be embodied in various devices other than those herein specifically illustrated and described, without departure from its proper spirit and scope as defined by the appended claims:

We claim:

1. In a blank folding machine, in combination, a movable bed upon which the blank to be folded is placed, means for folding the edges of the blank, a presser adapted to be seated on the folded edges of the blank, and means for actuating the bed to press the folded blank between the bed and the presser, said means including a toggle lever connected with the bed, and mechanism for straightening and buckling the toggle lever.

2. In a blank-folding machine, in combination, a movable bed upon which the blank to be folded is placed, a templet adapted to be seated on the blank, folding devices for folding the blank edges inwardly over the edges of the templet, means for moving the folding devices inwardly and outwardly with respect to the blank, a movable presser adapted to be seated on the folded blank-edges after withdrawal of the folding devices therefrom, and means for actuating the bed to press the folded blank between the bed and the presser.

3. In a blank-folding machine, in combination, a movable bed upon which the blank to be folded is placed, folding devices adapted to fold the blank-edges inwardly, a movable presser adapted to be seated on the folded edges of the blank, means for locking the presser in its seated position, and means for actuating the bed to press the folded blank between the bed and the presser.

4. In a blank-folding machine, in combination, a movable bed upon which the blank to be folded is placed, a presser adapted to be seated on the folded blank-edges, and means for actuating the bed to press the folded blank between the bed and the presser, comprising a toggle lever having one end in pivotal connection with the bed, a support for the other end of the toggle lever, and a cam associated with the toggle lever to straighten and buckle the same.

5. In a blank-folding machine, in combination, a movable bed upon which the blank to be folded is placed, a presser adapted to be seated on the folded blank-edges, and means for actuating the bed to press the folded blank between the bed and the presser, comprising a toggle lever having one end in pivotal connection with the bed, a support for the other end of the toggle lever, a rocker arm associated with the supported end of the toggle lever, and a cam for rocking said arm to straighten and buckle the toggle lever.

6. In a blank-folding machine, in combination, a stationary bed plate, a movable bed associated therewith, a presser adapted to be seated upon a folded blank on said bed, and means for actuating the bed to press the folded blank between the bed and the presser, comprising brackets depending from the bed plate, a shaft mounted in the brackets, toggle levers having their lower ends mounted on the shaft and their upper ends pivotally connected with the bed, an arm connected with the toggle levers to straighten and buckle the same, and means for actuating said arm.

7. In a blank-folding machine, in combination, a movable bed upon which the blank to be folded is placed, a presser adapted to be seated on a folded blank on said bed, a toggle lever having one end connected with the bed, a support for the other end of the toggle lever, means for straightening and buckling the toggle lever to actuate the bed, and means for adjusting said support to regulate the pressure exerted between the bed and the presser when the toggle lever is straightened.

8. In a blank-folding machine in combination, a movable bed upon which the blank to be folded is placed, a presser adapted to be seated on the folded blank on said bed, a toggle lever having an end connected with the bed, a shaft constituting a support for the other end of the toggle lever, means for straightening and buckling the toggle lever to actuate the movable bed, and bearings for said shaft adjustable relatively to the bed to vary the extent of movement of the latter.

9. In a blank-folding machine, in combination, a bed upon which the blank to be folded is placed, a presser movable toward and from the bed and adapted to be seated on the folded blank, hooked levers at the sides of the presser adapted to lock the same in its seated position, and means for actuating the levers to lock and release the presser.

10. In a blank-folding machine, in combination, a bed upon which the blank to be folded is placed, a presser movable toward and from the bed and adapted to be seated on the folded blank, hooked levers at the sides of the presser to lock the same in its seated position, and cams associated with the levers to actuate the same.

11. In a blank-folding machine, in combination, a movable bed upon which the blank to be folded is placed, a presser head movable toward and from the bed and having a supporting plate, a presser movably suspended from the plate, means for depressing the presser and locking the same in depressed position, and means for raising the bed to press the folded blank between the bed and the locked presser.

12. In a blank-folding machine, in combination, a bed upon which the blank to be folded is placed, a presser head movable toward and from the bed and having a supporting plate, a presser yieldingly suspended from the plate, and means for depressing the presser and locking the same in depressed position, comprising levers arranged to coöperate with the presser and devices for actuating the levers.

13. In a blank-folding machine, in combination, a bed upon which the blank to be folded is placed, a presser head movable toward and from the bed and carrying a presser adapted to be seated on a folded blank on said bed, upwardly extending levers at the sides of the bed having means for engaging the presser and holding the same against upwardly exerted pressure, mechanism for actuating the levers to engage and release the presser, and means for raising the bed to press the folded blank between the bed and the presser.

14. In a blank-folding machine, in combination, a movable bed upon which the blank to be folded is placed, a presser adapted to be seated on the folded edges of the blank, mechanism for so seating the presser, mechanism for locking the presser in its seated position, mechanism for actuating the bed to press the folded blank-edges between the bed and the locked presser, and means for actuating said mechanisms in the order named.

15. In a blank-folding machine, in combination, a movable bed upon which the blank to be folded is placed, a presser head, a presser yieldingly carried by the head, mechanism for moving the head to seat the presser on the folded edges of the blank, mechanism for locking the presser in seated position, mechanism for moving the bed to press the folded edges of the blank between the bed and the presser, and means to actuate said mechanisms in the order named and then to reverse the operation of each in the reverse of the order named.

16. In a blank-folding machine, in combination, a movable bed, a movable support, a presser movable with the support and adapted to be seated on the folded edges of a blank resting on the bed, mechanism for moving the support to so seat the presser, mechanism for locking the presser so seated, mechanism for moving the bed to press the folded edges of the blank between the bed and the presser, a shaft, and means actuated by the shaft to operate the said mechanism in the order named.

17. In a blank-folding machine, in combination, a movable bed, a movable presser adapted to be seated on the folded edges of a blank resting on the bed, mechanism for locking the presser in seated position, mechanism for moving the bed to press the folded edges of the blank between the bed and the presser, a shaft, and cams actuated by the shaft to operate the said mechanisms in the order named.

18. In a blank-folding machine, in combination, a movable bed upon which the blank to be folded is placed, a presser movable toward and from the bed and adapted to be seated on the folded edges of the blank, mechanism for locking the presser in seated position, a toggle connected with the bed to actuate the same, a shaft, a cam on the shaft to actuate the locking mechanism, and a cam on the shaft to actuate the toggle, said cams being timed to operate the locking mechanism and the toggle in the order named.

19. In a blank-folding machine, in combination, a movable bed on which the blank to be folded is placed, a support movable to and from a position adjacent to the bed, a presser carried by the support and movable toward and from the bed independently of the support when the latter is in said adjacent position, and means operating first to move the presser toward the bed independently of the support to seat the presser on the folded edges of the blank and then to lock the presser in seated position, and mechanism for moving the bed after the presser is locked, to press the folded edges of the blank between the bed and the presser.

20. In a blank-folding machine, in combination, a bed on which the blank to be folded is placed, a support movable toward and from the bed, a presser carried by the support and having limited movement toward and from the bed independently of the support, mechanism for actuating the support to move the same and the presser toward the bed, mechanism for moving the presser independently of the support and seating the same on the folded edges of the blank, and means for actuating said mechanisms in the order named.

21. In a blank-folding machine, in combination, a bed on which the blank to be folded is placed, a presser movable into a position parallel to said bed, levers adjacent to the sides of the bed and having means to engage the presser and seat the same on the folded edges of the blank on the bed, a shaft, cams on the shaft for the respective levers to actuate the same, and means for actuating the shaft.

22. In a blank-folding machine, in combination, a movable bed, a presser to coöperate with the bed, a support carrying the presser and movable toward and from the bed, a driving shaft, a reciprocatory link connected at one end with said support to actuate the same and having its other end mounted on the shaft to slide transversely thereof, means actuated by the shaft to reciprocate the link, mechanism for locking the presser relatively to the bed, means actuated by the shaft to operate the locking mechanism, mechanism for moving the bed to press the folded blank between the presser and the bed, means actuated by the shaft to operate the bed-moving mechanism, the several means being timed to operate in the order named, and means for continuously rotating the shaft.

23. In a blank-folding machine, in combination, a movable bed on which the blank to be folded is placed, a support movable toward and from the bed, a presser yieldingly carried by the support and provided with cam-lugs, levers mounted adjacent to the bed and having cam-hooks adapted to engage said cam lugs to move the presser into contact with the folded edges of the blank, and means to actuate the levers.

24. In a blank-folding machine, in combination, a movable bed on which the blank to be folded is placed, folding devices movable inwardly to fold the blank-edges and outwardly for withdrawal from the folded edges, mechanism for actuating the folding devices, a movable presser adapted to be seated on the folded edges of the blank, mechanism for moving the presser, mechanism for locking the presser in seated position, mechanism for moving the bed to press the folded edges of the blank between the bed and the presser, and means for operating the said mechanisms and the order named, whereby to first fold the blank-edges and withdraw the folding devices therefrom, then seat and lock the presser, and then move the bed to press the folded edges.

25. In a blank-folding machine, in combination, a movable bed on which the blank to be folded is placed, a templet adapted to be seated on the blank and mechanism for so seating the templet, folding devices movable inwardly to fold the edges of the blank over the templet edges and outwardly for withdrawal from the folded blank-edges, mechanism for actuating the folding devices in the manner stated, a presser adapted to be seated on the folded blank-edges, mechanism for locking the presser in seated position, mechanism for moving the bed to press the folded blank-edges between the bed and the presser, and means to actuate said mechanisms in the order named.

JOSEPH H. RAMSEY.
HARLEY M. CLEARWATER.
JOHN TEMPLE.

Witnesses:
 CHAS. H. RAMSEY,
 EDITH R. ZEH.

Copies of this patent may be obtained for five cents each, by addressing the "Commissioner of Patents, Washington, D. C."